United States Patent
Barbee et al.

(10) Patent No.: US 7,370,903 B2
(45) Date of Patent: May 13, 2008

(54) TRANSPARENT LAMINATED STRUCTURE HAVING PEEL-AWAY FILM LAYERS FOR USE ON AIRCRAFT WINDSCREENS

(75) Inventors: Brent W. Barbee, Stanfield, NC (US); E. Andrew Hough, Charlotte, NC (US)

(73) Assignee: United Protective Technologies, LLC, Charlotte, NC (US)

( * ) Notice: Subject to any disclaimer, the term of this patent is extended or adjusted under 35 U.S.C. 154(b) by 68 days.

(21) Appl. No.: 10/909,129

(22) Filed: Jul. 30, 2004

(65) Prior Publication Data

US 2005/0200154 A1    Sep. 15, 2005

Related U.S. Application Data

(63) Continuation-in-part of application No. 10/434,771, filed on May 9, 2003, now abandoned.

(60) Provisional application No. 60/379,582, filed on May 10, 2002.

(51) Int. Cl.
*B60J 11/06*   (2006.01)

(52) U.S. Cl. .................. 296/95.1; 296/136.02; 428/40.1; 160/370.21; 150/168

(58) Field of Classification Search ............. 296/95.1, 296/136.02, 136.01; 160/370.21; 150/168; 428/40.1, 441
See application file for complete search history.

(56) References Cited

U.S. PATENT DOCUMENTS

| | | | | |
|---|---|---|---|---|
| 5,002,326 A | * | 3/1991 | Westfield et al. | 296/95.1 |
| 5,860,689 A | * | 1/1999 | Campfield et al. | 296/95.1 |
| 6,660,389 B2 | * | 12/2003 | Liu et al. | 428/421 |

* cited by examiner

*Primary Examiner*—Joseph D Pape
(74) *Attorney, Agent, or Firm*—Everman Law Firm, PA; Gregory R. Everman

(57) ABSTRACT

A transparent laminated structure having multiple peel-away laminated film layers for protecting windscreens, particularly windscreens of rotary aircraft, from environmental conditions. The laminated structure includes at least one laminated layer wherein each layer includes a film, a bonding layer on a first major side of the film for releaseably attaching the film to either the windscreen or to an adjacent laminated film layer, a conductive material on a second major side of the film for dissipating electrostatic charging in the laminated structure that may occur due to accumulated precipitation static during aircraft fight, and a hard coat layer for protecting the relatively softer film against abrasion. As the outermost film layer becomes degraded below acceptable levels, that film may be easily removed, exposing a subsequent unblemished film layer.

24 Claims, 3 Drawing Sheets

TRANSPARENT LAMINATED STRUCTURE HAVING PEEL-AWAY FILM LAYERS FOR USE ON AIRCRAFT WINDSCREENS

CROSS REFERENCE TO RELATED APPLICATIONS

This application is a continuation-in-part of U.S. patent application Ser. No. 10/434,771, filed May 9, 2003; now abandoned which claims the benefit of U.S. Provisional Application Ser. No. 60/379,582, filed May 10, 2002.

The U.S. Government has a paid-up license in this invention and the right in limited circumstances to require the patent owner to license others on reasonable terms as provided for by the terms contract No. H92222-04-P-0052 awarded by SOCOM.

BACKGROUND OF THE INVENTION

1. Field of the Invention

The present invention relates generally to the field of protective coverings for windscreens and, more specifically, to a transparent laminated structure having multiple peel-away film layers for protecting windscreens of rotary aircraft.

2. Description of the Related Art

The degradation of aircraft windscreens is a costly problem that also effects safety and mission effectiveness due to distortion of visual and RF electromagnetic wavelengths that pass through a damaged windscreen or sensor window. As such, clarity through aircraft windscreens and sensor windows is imperative for proper operation of an aircraft.

Currently, rotary aircraft windscreens and sensor windows are unprotected from environmental damage. As such, the windscreens and sensor windows quickly degrade with scratches and cracks, distorting visible and RF electromagnetic wavelengths that pass there-through. Accordingly, a pilot's or crew member's visibility, his use of night vision goggles, and/or the operation of sensors are impaired which may cause operator error and/or sensor errors, thereby inhibiting mission effectiveness. Additionally, small fissures and defects in the windscreen may be propagated by stress and vibrations during aircraft use, rendering the windscreen entirely unsatisfactory.

The rate of windscreen deterioration is particularly problematic with helicopters, especially those that are performing desert missions since, in addition to blowing sand and debris, the rotor blades of the helicopter and neighboring helicopters can disturb sand and rocks causing a whirlwind of abrasive particles.

Traditionally, various polishes have been used to remove scratches from marred aircraft windscreens. However, the polishing process is not only time consuming, but also may leave swirl marks that dramatically distort the passage of visible and RF electromagnetic wavelengths through the windscreen.

By having no current means to protect windscreens and only a limited ability to recondition the same, aircraft windscreens quickly degrade beyond acceptable standards and require replacement; an expensive and time consuming process.

In the art of vehicle racing such as NASCAR®, multi-layered transparent film has been used to extend the useful life of a vehicle's windshield. However, such automotive films are not suitable for usage in the art of rotary aircraft due to a multitude of limitations.

First, electrostatic surface dissipation is extremely slow through automotive films as compared to an aircraft window. As such, if automotive film was used on an aircraft, precipitation static charging of the film could cause unwanted electrical interference in aircraft electrical equipment; disrupting the equipment and presenting a safety hazard. Electrostatic charging is particularly problematic in a dry dusty environment such as the desert.

Additionally, automotive films may not suitably perform under the operational conditions at which a rotary aircraft is subjected. For example, if an automotive film was used on an aircraft, the adhesion between the vehicle film and an aircraft windscreen could fail due to high windshear forces and/or high temperatures that may be experienced during aircraft usage.

Moreover, automotive films are not sufficiently constructed to absorb the type of impact that may be experienced by an aircraft windscreen, such as rocks that are kicked-up by the rotor blades.

Since degradation of an aircraft windscreen reduces pilot and sensory effectiveness, there is, therefore, a need in the art to provide a transparent laminated structure having multiple film layers for protecting windscreens from damage. Additionally, there exists a need in the art for a transparent laminated structure that is suitable for being used under the environmental conditions experienced by rotary aircraft. There further exists a need in the art of a transparent laminated structure that has an electrostatic dissipation rate that is sufficient to obviate potential arc-over from the structure.

BRIEF SUMMARY OF THE INVENTION

To achieve the foregoing and other objects, the present invention, as embodied and broadly described herein, provides various embodiments of a transparent laminated structure having multiple peel-away film layers for protecting windscreens, particularly windscreens of rotary aircraft, from environmental conditions.

In a preferred embodiment of the present invention, a transparent laminated structure includes at least one film which has a first and second sides. A bonding layer is applied on the first film side for releaseably attaching the film to another film or to a windscreen. A conductive material is applied to the second side of the film for dissipating electrostatic charges within the laminated structure that may be created during aircraft operation. Thus, the conductive material obviates potentially damaging arc-over from the laminated structure to aircraft equipment or personnel. Optionally, the structure may further include a hard coat that is disposed on the conductive material for protecting the relatively softer film against abrasion. As the outermost film becomes degraded below acceptable levels, the film may be easily removed, exposing a subsequent unblemished film layer.

In an embodiment, the conductive material may be a conductive oxide or a conductive carbon. Ideally, the conductive material allows for an average electrostatic discharge rate of at least 0.05 kv/second during the period that voltage within the structure is being reduced from 16 kv to 4 kv.

In a preferred embodiment, the laminated structure includes first and second laminated layers, each having a film, a bonding layer that is attached to the respective film, and a conductive material that is attached to the respective film and a hard coat that is attached to the respective conductive material. The bonding layer of the first film is adapted for releasably attaching the first laminated layer to a windscreen, such as a windscreen of a rotary aircraft. The bonding layer of the second film releaseably attaches the second film layer to the first film layer.

Optionally, the first and second conductive materials are a conductive oxide or a conductive carbon. As another option, the first film bonding layer has adhesion strength in a range of 1,800 g/in width to 5,000 g/in width and the second film bonding layer has adhesion strength in a range of 180 g/in width to 600 g/in width. In still another option, the laminated structure is sufficiently transparent such that it allows for visible light transmission of at least 85%.

In yet another option, the laminated structure has an average electrostatic dissipation rate of at least 0.05 kv/second during the period that the charge within the structure is reduced from 16 kv to 4 kv.

BRIEF DESCRIPTION OF THE DRAWINGS

The above described and other features, aspects, and advantages of the present invention are better understood when the following detailed description of the invention is read with reference to the accompanying drawings, wherein.

DETAILED DESCRIPTION OF THE INVENTION

The present invention will now be described more fully hereinafter with reference to the accompanying drawings in which preferred embodiments of the invention are shown. This invention may, however, be embodied in many different forms and should not be construed as limited to the embodiments set forth herein. These exemplary embodiments are provided so that this disclosure will be both thorough and complete, and will fully convey the scope of the invention to those skilled in the art. As used herein, like reference numbers in different embodiments refer to like elements.

The present invention is a transparent laminated structure having multiple peel-away film layers for protecting windscreens and, in particular, for protecting a windscreen of an aircraft, particularly a rotary aircraft, against environmental effects. Specifically, the laminated structure provides a protective layer over the outer surface of a windscreen in order to insulate the windscreen from blowing sand, particles, stones and other projectiles that could otherwise scratch, mar, soil or damage the windscreen. Accordingly, the invented windscreen protector reduces the need for costly and time consuming repair and/or replacement of the windscreen.

In various embodiments, the laminated structure includes multiple peel-away laminated film layers wherein the outermost film layer may, upon becoming degraded, be removed thereby exposing a subsequent unblemished layer. As such, the passage of visible and RF electromagnetic wavelengths through the structure, and accordingly through the windscreen, may be maintained in an acceptable range that does not significantly impair visible and RF electromagnetic wavelengths that pass there-through. As such, optimal pilot visibility, night vision goggle usage and electronic sensors operation may be maintained by simply removing film layers as they become damaged.

As used herein, the term "windscreen" includes windscreens, windows, sensor windows, and the like. The windscreen may be made of any suitable material including plastic, for example polycarbonate or acrylic; glass; or combination thereof. It is also noted that although the present invention has particular utility when used on rotary aircraft, it may be used on windscreens in general including airplane windscreens and automotive windshields.

In various embodiments of the present invention, the transparent laminated structure may further include a conductive material that allows for the structure to quickly dissipate built-up electrostatic charges within in the structure. As such, the conductive material reduces the potential of arc-over between the laminated structure and aircraft equipment or personnel.

Figure 1:
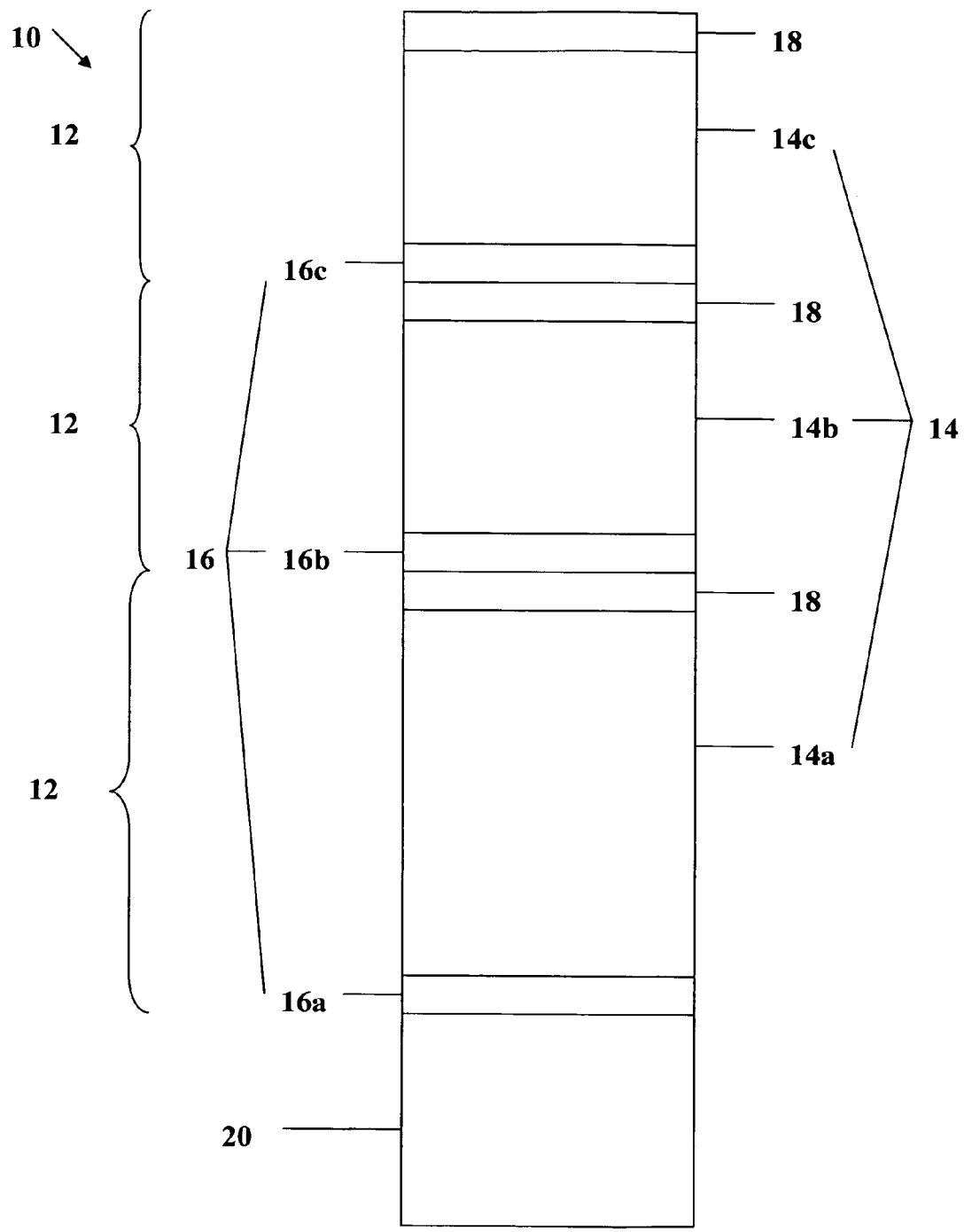
FIG. 1 is an enlarged side view of the invented transparent laminated structure having multiple peel-away laminated film layers for protecting aircraft windscreens in accordance with an exemplary embodiment of the present invention.

Referring to the drawings, and particularly to FIG. 1, the present invention is a transparent laminated structure 10 that includes at least one laminated film layer 12, wherein each laminated layer includes a transparent film 14 (14a, 14b, 14c), a bonding layer 16 (16a, 16b, 16c) on a first major side of the film 14 and a hard coat layer 18 on a second major side of the film 14. The present invention may have more or less laminated layers 12 than that as shown in the drawings.

The film 14 is transparent, having optical clarity and resistant to distortion once installed on a windscreen 20. The film 14 may be made of glass, plastic or a combination thereof. For example, the film 14 may comprise a polymer including but not limited to those selected from the following broad classifications of materials: polyester, polycarbonate, acrylic, polyurethanes, poly acetyl, polyolefin based ionomers, ethylene vinyl acetate polymers, polyethylene, polypropylene, polyvinyl chloride, polystyrene, urethane acrylate polymers, epoxy polymers, epoxy acrylate polymers, and blends thereof, for example. In the preferred embodiment, the film 14 is made of a polymeric material such as polyester, and more preferably polyethylene terephtahlata$_6$, due to its suitable properties of toughness, optical clarity, heat formability, high operating temperature range and high tensile strength. An exemplary film is made of Mylar® or Teijin®, each a product of Dupont. Another suitable film is sold under the name Proshield® by Pro-Tint, Inc. of Kannapolis, N.C.

Optionally, the film 14 further comprises stabilizers and fillers that enhance the durability of the film 14 and protect polymer composed items within the aircraft cockpit from exposure to ultraviolet light and/or heat. Additives may also be incorporated into the film 14 that reduce the flammability of the film 14, smoke generation during combustion, or yield other desirable characteristics.

Not the be construed as limiting, it is preferred that each film 14 has a thickness in a range of about 2 mm to 8 mm, so that the films 14 are durable yet manageable. It is also preferred that the composite thickness of the films 14 within the laminated structure 10 be in a range of about 4 mm to 20 mm and more preferably in a range of about 111 mm to 20 mm in order to provide energy absorption for the windscreen 20 against stone and debris impact while still allowing for acceptable visible and RF electromagnetic wavelengths to passage there-through. As the films 14 provide the majority of the laminated structure 10 thickness, the structure 10 likewise has a preferred thickness of about 4 mm to 20 mm, more preferably of about 11 mm to 20 mm.

It is also preferred, for energy absorption, wind-shear and film removal considerations, for the innermost base film 14a to have a greater thickness than the outer films 14b, 14c. That is, thinner outer films 14b, 14c have less perimeter edge surface against which wind-shear forces may react thereby reducing the amount of adhesive bonding force that is needed to maintain the films 14b, 14c from being prematurely removed from the laminated structure 10. As less adhesive force is required, the outer films (14c for example) may be easily peeled off without damaging or loosing the subsequent laminated layer 12.

In a preferred embodiment, the innermost base layer 14a has a thickness that is in a range of about 6 mm to 8 mm, in order to provide impact resistance, and the outer films 14b, 14c to have a thickness in a range of about 2 mm to 5 mm, in order to reduce wind-shear forces and to ease the removal of the films 14b, 14c once they become deteriorated.

The outer films 14b, 14c are attached to the subsequent laminated layer 12, and the innermost base film 14a to the windscreen 20, by a respective bonding layer 16 having an adhesive. The bonding layers 16 have sufficient bonding strength in order to maintain their respective films 14 from being displaced prematurely due to heat, wind-shear and/or other environmental conditions while still allowing for the outer film (14c for example) to be removed without damaging the hard coat (18b for example) of the subsequent film (14b for example).

The bonding layer 16 may comprise a non-pressure sensitive adhesive or, preferably, a pressure sensitive adhesive. The bonding layer 16 may, for example and not to be construed as limiting, be selected from the broad classifications of acrylics, rubbers, silicons, and polyolefins, and mixtures thereof. In a preferred embodiment, the bonding layer 16a between the base film 14a and the windscreen is either a solvent based acrylic or silicon in order to provide an aggressive bond there-between that is still capable of being overcome in order to allow for the base film 14a to be removed from the windshield 20. And, the bonding layers 16b, 16c between the films 14 are preferably a water based acrylic, to ease removal of the films 14b, 14c as necessary. The bonding layer 16 may optionally further comprise a component selected from the group consisting of tackifiers, oils, stabilizers, flame retardant filler, ultraviolet light absorbers, and ultraviolet light stabilizers, and mixtures thereof, subject to obtain desired properties.

Not to be construed as limiting, the adhesion strength of the bonding layer 16a between the windscreen and the innermost base film 14a is preferably in a range of about 1,800 g/in width to 5,000 g/in width, more preferably in a range of about 2,000 g/in width to 3,800 g/in width, and most preferably in a range of about 2,000 g/in width to 3,000 g/in width, as measured in accordance with ASTM D3330-96, STANDARD TEST METHOD FOR PEEL ADHESION FOR PRESSURE SENSATIVE TAPE, 2003.

Furthermore, the preferred bonding strength of the bonding layers 16b, 16c between films 14 is in a range of about 180 g/in width to 600 g/in width, and more preferably in a range of about 350 g/in width to 500 g/in width, also as measured in accordance with ASTM D3330-96.

In general, greater bonding strength is desired between the base film 14a and the windscreen 20 as compared to between the films 14 since the shear forces are highest at the innermost bonding layer 18a during flight missions. And, lesser bonding strength is desired between the films 14 so that the outer films (14c for example) may be removed without inadvertently removing the subsequent layer's hard coat (18b for example).

Preferably, at least about 80 percent, more preferably at least about 90 percent, and most preferably about 100 percent, of the first major side of each film 14 has the adhesive bonded thereto in order to maintain the film 14 from being prematurely displaced. It is also preferable that the bonding layer is continuous in order to eliminate air pockets beneath, and bumps in, the adjacent film.

In a preferred embodiment, and not to be construed as limiting, the bonding layer has a thickness ranging from about 25 microns to about 50 microns, and more preferably about 25 microns to about 35 microns. The bonding layer 16 is ideally thin such that it does not significantly affect visible and RF electromagnetic wavelength passage through the laminated structure.

In a preferred embodiment, each laminated layer 12 has a hard coat layer 18 in order to provide abrasion resistance against environmental conditions and, thereby, protect the underlying softer film 14. As it will be appreciated by those skilled in the art, any of the embodiments described herein may be configured without a hard coat layer, however, such a laminated structure would have a shortened life.

The hard coat may be any of several of those know in the art. For example, U.S. Pat. No. 4,478,876 discloses a process for coating a solid substrate such as polycarbonates, polyesters, polymethylmethacrylate, polyacrylates, and polyamides with an abrasion resistant silicone hard coat; U.S. Pat. No. 3,707,397 discloses an organolpolysiloxane hard coat for polycarbonate; U.S. Pat. No. 3,843,390 discloses polyester melamines and acrylic melamine hard coats; and U.S. Pat. No. 2,332,461 discloses allyl resin hard coats. Exemplary hard coats and methods for preparing the same are described in Lotz, Hans-Georg, "Thick optical multi-layered systems on PET Film" Applied Films, Germany, November 2001. In the preferred embodiment, the hard coat layer 18 is silicon based due to its durability and high level of clarity. Suitable hard coats are made by Bekaert of Brussels, Germany under the mark Armorgard™ and Clearshield™. It is noted that ultraviolet stabilizers and/or other stabilizers and fillers may be added to the hard coat in order to obtain desired properties.

A suitable hard coat preferably has a thickness in a range of about 20 nm to 300 nm and more preferably in a range of about 50 nm to 300 nm, although other thicknesses may be used.

An optional primer, as known in the art, may be used to assist having the hard coat layer 18 bond to the film 14. The primer promotes adhesion between the hard coat 18 and the film 14 which may be desirable where there are differences in the coefficient of thermal expansion between the layers 14, 18. Examples of various primers are disclosed in the following U.S. Pat. Nos. 4,313,979; 4,385,463; 4,477,499; 4,559,271; and 5,041,313 wherein the '313 patent is directed to a method for making silicone hard coat composites and primer compositions therefore whereby the primer and hard coat are applied to an aromatic thermoplastic substrate such as polycarbonate. It is noted that ultraviolet stabilizers and/or other stabilizers may be added to the optional primer.

Figure 2:
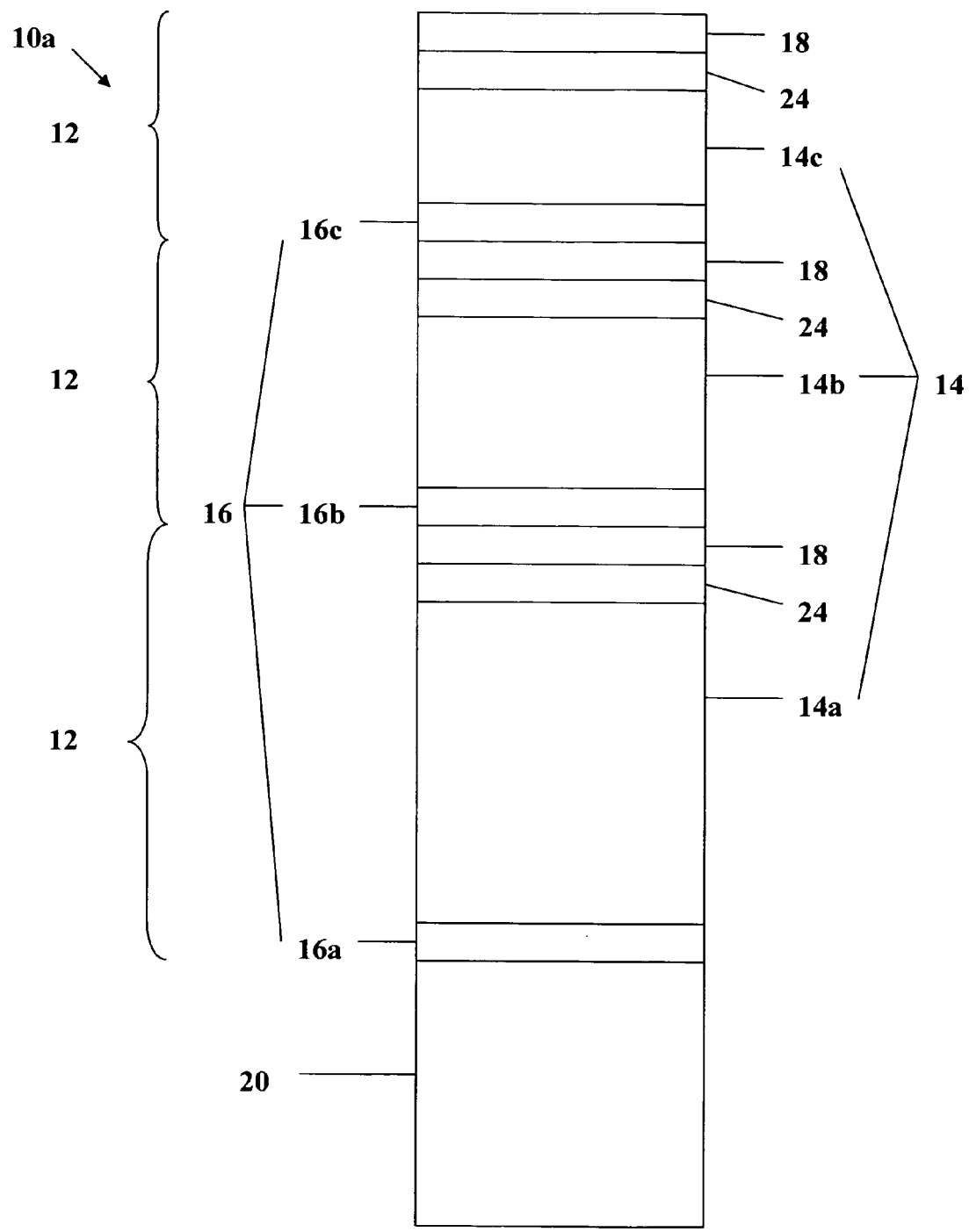
FIG. 2 is an enlarged side view of an alternative transparent laminated structure similar to that of FIG. 1, but further including conductive material for enhancing electrostatic dissipation of the structure, in accordance with an exemplary embodiment of the present invention.

Referring to FIG. 2, in a preferred embodiment, the laminated structure 10a may optionally include a conductive material 24 disposed on the second major side of the film 14. Where the laminated structure 10a also includes a hard coat layer 18, the conductive material 24 is disposed between the film 14 and the hard coat 18. As used herein, the term "conductive material" means any material or substance that is more electrically conductive than the film 14. That is, in a preferred embodiment, the conductive material 24 is more conductive than polyester and, in particular, more conductive than Mylar®.

Without the conductive material 24 (as illustrated by FIG. 1), the film 14 may become highly charged due to precipitation static accumulation during aircraft flight. And, due to the resistivity of the film 14, the charges may not readily travel within the material to create an equilibrium of electrical charges. Therefore, highly charged pockets may be created. These charged pockets may be a shock hazard to personnel and/or equipment if the magnitude of the charge is sustained for a period of time and at a relatively high value. Resulting arcing may cause scaring of the film 14 and possibly cause radio interference. A further problem is that the film 14 may have a capacitive effect whereby if temporary means, such as wiping the outermost film 14c with a grounded conductive glove, is used to discharge the film 14, the film 14 may regain an unacceptable charge due to stored energy therein.

The conductive material 24 enhances electrostatic dissipation of the laminated structure 10a by providing a low impedance path for charges to migrate from the laminated structure 10a to a ground, such as the airframe. In a preferred embodiment and not to be construed as limiting, the average electrostatic dissipation rate from 16 kv to 4 kv is at least 0.02 kv/second, more preferably at least 0.05 kv/second, and most preferably at least 0.10 kv/second.

In a preferred embodiment, the conductive material 24 is a conductive oxide. Examples of conductive oxides include but are not limited to those selected from the following broad classifications of materials: tin oxide, indium oxide, cadmium oxide, gallium oxide, copper oxide and zinc oxide, antimony tin oxide, indium tin oxide, p-type zinc oxide and $ZnO/Al_2O_3$, and mixtures thereof. Most preferably, the conductive material 24 is of indium tin oxide.

The conductive oxide may be applied to the film 14 by any known means. For example, the conductive oxide may be applied to the film 14 by physical vapor deposition.

The conductive oxide is applied and configured so that it does not significantly interfere with the passage of visible or RF electromagnetic wavelengths through the laminated structure 10a. As such, but not limited thereto, it is preferred that the conductive oxide layer have a thickness that is in a range of about 10 nm to 300 nm, and more preferably in a range of about 15 nm to 35 nm.

The conductive oxide may cover only a portion, or, preferably the entirety, of the second major side of the film 14.

Figure 3:
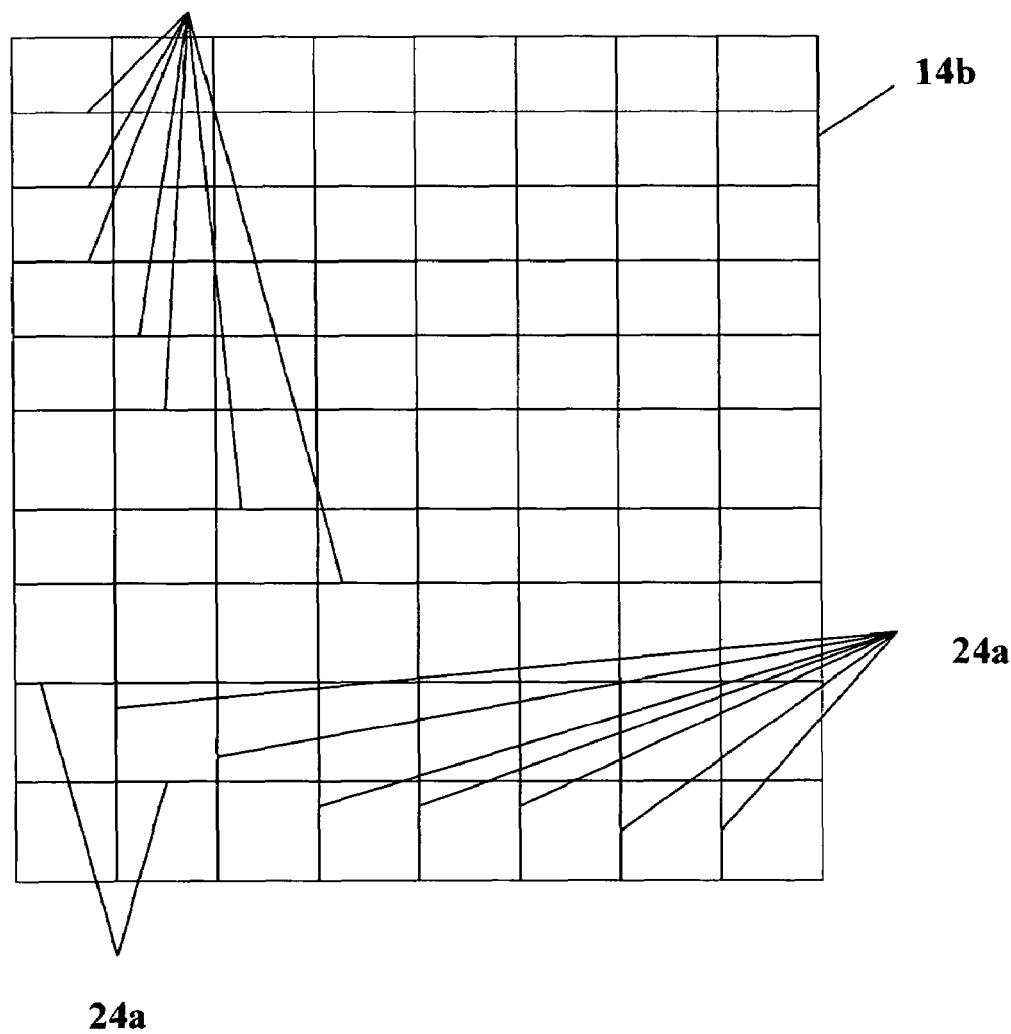
FIG. 3 is an fragmented, enlarged top view of a film within the laminated structure, showing the conductive material as being a conductive carbon, wherein the conductive carbon is disposed in a micro-grid pattern on the film.

In another embodiment, the conductive material may be a conductive carbon that is applied to the second major side of the film 14. As excessive conductive carbon may interfere with visible and RF electromagnetic wavelengths through the laminated structure, the conductive carbon is formed on the film 14 in a random or pre-determined micro-grid pattern. FIG. 3 is a top view of the film (14b for example) illustrating the concept of a micro-grid pattern of conductive carbon 24a. As it will be appreciate by this skilled in the art, the shown thickness of the conductive carbon 24a strands are greatly magnified in order to make the strands visible in the drawings. As applied in the field, the micro-strands must be sufficiently thin such that they do not significantly interfere with the passage of visible and RF wavelengths through the laminated structure, as defined below. And, the number of strands and the pattern of the strands may vary from that shown.

In yet another embodiment (not shown), the conductive material may comprise micro and/or nano conductive threads and/or wires that are applied to the second major side of the film 14 in a pattern.

For each of the described embodiments that included a conductive material, an optional grounding mechanism (not shown) may be provided around the perimeter of the laminated structure in order to provide a low impedance path for the charge to migrate from the laminated structure to the airframe.

For example, the grounding mechanism may be a conductive tape that is attached to the perimeter of the laminated structure. As another example, the grounding mechanism may be a conductive carbon band that is provided around the perimeter of the laminated structure.

In the various described embodiments, the laminated structure does not significantly impair visible or RF electromagnetic wavelengths. As used herein, "does not significantly impair" means that visible light transmission through the laminated structure is preferably at least 75%, more preferably at least 85%, and more preferably at least 89%, as measured in accordance with ASTM D1003, STANDARD TEST METHOD FOR HAZE AND LUMINOUS TRANSMITTANCE OF TRANSPARENT PLASTICS, 2003.

In each of the previously described embodiments, the films may be provided with a film removal means (not shown) for individually removing the film from the laminated structure. In one example of the film removal means, each film may further comprise a stripper tab provided at the edge of the film. The outermost film may be removed by gripping the tap and pulling the film away from the laminated structure.

As another example, the film removal means may be a recess that is provided in each of the films. The outmost film may be removed from the laminated structure by inserting his thumbnail or a thin tool into the recess and under the film, then peeling-away the outermost film.

In still another example, the outermost film may be removed by gripping the film with an adhesive wand and then pulling the film away from the laminated structure.

In yet another example, each film has a hole which extends through that film, wherein the holes in the films are staggered such that the holes do not overlap and wherein the outermost film may be removed by using a tool (such as a pick) which can be inserted into the hole of the outermost film and used to pull that film away from the laminated structure.

As the innermost base film 14a may be held in place by a substantial bonding force, it may be desirable to cut the film 14a into strips, then removing the film 14a in sections.

The foregoing provides a detailed description of exemplary embodiments of the present invention. Although specific embodiments of a transparent laminated structure having multiple peel-away film layers for protecting windscreens have been described with reference to preferred embodiments and examples thereof, other embodiments and examples may perform similar functions and/or achieve similar results. All such equivalent embodiments and examples are within the spirit and scope of the present invention and are intended to be covered by the following claims.

That which is claimed is:

1. A transparent laminated structure for use with a windscreen, comprising:
   a film having a first major side and a second major side;
   a first bonding layer disposed on the first major side of said film;

a conductive material disposed on the second major side of said film; and wherein said laminated structure has an average electrostatic dissipation rate of at least 0.02 kv/second when measured from 16 kv to 4 kv.

2. The laminated structure in accordance with claim 1 further comprising a hard coat disposed on said conductive material.

3. The laminated structure in accordance with claim 2 wherein said conductive material is a conductive oxide.

4. The laminated structure in accordance with claim 2 wherein said conductive material is conductive carbon.

5. The laminated structure in accordance with claim 1 wherein said first bonding layer has a bonding strength in a range of about 1,800 g/in width to 5,000 g/in width.

6. The laminated structure in accordance with claim 5 further comprising a hard coat disposed on said conductive material and a second bonding layer wherein said second bonding layer is disposed on said hard coat and wherein said second bonding layer has a bonding strength in a range of about 180 g/in width to 600 g/in width.

7. The laminated structure in accordance with claim 2 wherein the said laminated structure has a thickness in a range of about 11 mm to 20 mm.

8. The laminated structure in accordance with claim 7 wherein said film has a thickness in a range of about 6 to 8 mm.

9. The laminated structure in accordance with claim 2 wherein said laminated structure has visible light transmission of at least 85%.

10. The laminated structure in accordance with claim 2 wherein said laminated structure has an average electrostatic dissipation rate of at least 0.05 kv/second when measured from 16 kv to 4 kv.

11. A transparent laminated structure, comprising:
a first laminated layer, including
a first film having first and second major sides,
a first bonding layer attached to the first major side of said first film,
a first conductive material attached to the second major side of said first film,
a first hard coat attached to said first conductive material,
wherein said first bonding layer is adapted to releaseably attach said first laminated layer to a windscreen,
wherein said laminated structure has an average electrostatic dissipation rate of at least 0.02 kv/second when measured from 16 kv to 4 kv.

12. The laminated structure in accordance with claim 11 further comprising:
a second laminated layer, including
a second film,
a second bonding layer that releaseably attaches said second film to said first hard coat,
a second conductive material attached to said second film, and
a second hard coat attached to said second conductive material.

13. The laminated structure in according with claim 12, wherein said first and second conductive materials are a conductive oxide.

14. The laminated structure in accordance with claim 12, wherein said first bonding layer has a bonding strength in a range of about 1,800 g/in width to 5,000 g/in width.

15. The laminated structure in accordance with claim 12, wherein said second bonding layer has a bonding strength in a range of about 180 g/in width to 600 g/in width.

16. The laminated structure in accordance with claim 12 wherein said laminated structure allows for visible light transmission of at least 85%.

17. The laminated structure in according with claim 12 wherein said first film has a thickness in a range of about 6 mm to 8 mm and wherein said second film has a thickness in a range of about 2 to 5 mm and said laminated structure has a thickness in a range of about 8 mm to 20 mm.

18. The laminated structure in accordance with claim 12 wherein said laminated structure has an average electrostatic dissipation rate of at least 0.05 kv/second when measured from 16 kv to 4 kv.

19. A transparent structure for use on an windscreen, comprising:
a film;
a bonding layer for maintaining said film from being prematurely displaced from said windscreen;
a conductive material adapted for providing electrostatic dissipation of said transparent structure;
wherein said bonding layer allows for said film to be selectively removed from said windscreen; and
wherein said transparent structure has an average electrostatic dissipation rate of at least 0.02 kv/second when measured from 16 kv to 4 kv.

20. The transparent structure in accordance with claim 19 wherein said transparent structure has an average electrostatic dissipation rate of at least 0.05 kv/second when measured from 16 kv to 4 kv.

21. The transparent structure in accordance with claim 19 further including a hard coat for protecting said film and wherein said transparent structure is grounded to an aircraft airframe.

22. The transparent structure in accordance with claim 19, wherein said bonding layer has a bonding strength in a range of about 1,800 g/in width to 5,000 g/in width.

23. The transparent structure in accordance with claim 19 wherein said transparent structure allows for visible light transmission of at least 85%.

24. The laminated structure in accordance with claim 1 wherein said laminated structure has an average electrostatic dissipation rate of at least 0.05 kv/second when measured from 16 kv to 4 kv.

* * * * *